(12) United States Patent
Siwak (10) Patent No.: US 9,314,001 B2
(45) Date of Patent: Apr. 19, 2016

(54) MAGNETIC COUPLER

(71) Applicant: Greg Siwak, Clayton, MO (US)

(72) Inventor: Greg Siwak, Clayton, MO (US)

( * ) Notice: Subject to any disclaimer, the term of this patent is extended or adjusted under 35 U.S.C. 154(b) by 156 days.

(21) Appl. No.: 14/195,493

(22) Filed: Mar. 3, 2014

(65) Prior Publication Data

US 2014/0250639 A1 Sep. 11, 2014

Related U.S. Application Data (60) Provisional application No. 61/772,763, filed on Mar. 5, 2013.

(51) Int. Cl.
| | | |
|---|---|---|
| *A01K 27/00* | (2006.01) | |
| *F16B 21/16* | (2006.01) | |
| *F16B 1/00* | (2006.01) | |

(52) U.S. Cl.
CPC ............ *A01K 27/005* (2013.01); *F16B 21/165* (2013.01); *F16B 2001/0035* (2013.01); *Y10T 24/32* (2015.01)

(58) Field of Classification Search
CPC .............. A01K 27/005; F16B 2001/0035; F16B 21/165; Y10T 24/32
USPC .......................................................... 24/303
See application file for complete search history.

(56) References Cited

U.S. PATENT DOCUMENTS

| | | | |
|---|---|---|---|
| 2,796,284 A | 6/1957 | Benson et al. | |
| 3,086,268 A | 4/1963 | Chaffin, Jr. | |
| 3,589,341 A | 6/1971 | Krebs | |
| 4,120,232 A | 10/1978 | Hoffman | |
| 4,404,714 A * | 9/1983 | Duran ................... F16B 21/165 24/652 |
| 4,690,495 A * | 9/1987 | Giannini .................. G02B 6/32 385/57 |
| 5,103,771 A * | 4/1992 | Lee .......................... F16G 11/10 119/776 |
| 6,041,571 A * | 3/2000 | Fields .................... B65B 7/2835 310/103 |
| 6,205,956 B1 | 3/2001 | Dickie et al. | |
| 6,247,427 B1 | 6/2001 | De Bien | |
| 6,499,437 B1 | 12/2002 | Sorensen et al. | |
| 6,532,903 B2 | 3/2003 | Prusia et al. | |
| 6,629,511 B2 | 10/2003 | De Bien | |
| 6,955,138 B2 | 10/2005 | De Bien | |
| 7,162,978 B2 | 1/2007 | De Bien | |
| 7,389,750 B1 | 6/2008 | Rogers et al. | |
| 7,640,639 B2 | 1/2010 | De Bien | |
| 7,757,639 B1 | 7/2010 | Prendes | |
| 7,954,211 B2 | 6/2011 | De Bien | |
| 8,490,256 B2 * | 7/2013 | Carter ....................... F41H 1/02 24/603 |
| 2011/0209509 A1* | 9/2011 | Nickeas .............. E05B 47/0045 70/276 |

\* cited by examiner

*Primary Examiner* — Robert J Sandy
*Assistant Examiner* — David Upchurch
(74) *Attorney, Agent, or Firm* — Jay J. Hoette; The Small Patent Law Group, LLC (57) ABSTRACT

A connector system includes an insert configured to be attached to a first object and a magnetic coupler configured to be attached to a second object. The magnetic coupler has a quick connect receiver receiving the insert. The magnetic coupler has a magnet magnetically attracting the insert into the quick connect receiver. The magnetic coupler has insert latches engaging and locking the insert in the quick connect receiver. The insert latches are releasable to allow the insert to be removed from the quick connect receiver.

20 Claims, 8 Drawing Sheets

FIG. 10

MAGNETIC COUPLER

CROSS REFERENCE TO RELATED APPLICATIONS

This application claims the benefit of U.S. Provisional Application No. 61/772,763 filed Mar. 5, 2013 and titled MAGNETIC COUPLER, the subject matter of which is herein incorporated by reference in its entirety.

BACKGROUND OF THE INVENTION

The subject matter herein relates generally to magnetic couplers.

There are many instances where a tether has to be selectively attached or detached from a secondary object. For instance, boats have to be connected and disconnected from docks. Cargo straps have to be attached and detached to cargo on the bed of a truck. Leashes have to be attached and detached from collars of pets.

The most popular connector used to attach a tether to a secondary object is a spring hook. A spring hook is a hooked structure having an open eye. A spring biased pawl obstructs the access into the eye. The spring biased pawl must be manipulated out of the way before the open eye of the hook structure can receive a loop. A problem associated with spring hook connectors is that they are difficult to attach and detach using only one hand. Such spring hooks are also particularly difficult to attach and detach if the secondary object is movable, such as when connected to a collar of a pet.

In the prior art pet leashes, many designs have been created that attempt to improve the ease with which a person can attach a leash to a collar. Some of these prior art connectors utilize magnetic attraction. For instance, in U.S. Pat. No. 3,589,341 to Krebs, entitled Animal Collar With Magnetic Fastener, a coupling is shown that closes using magnetic attraction. Such a collar coupling is very easily closed. However, should an animal pull on the collar with any force greater than the forces of the attracting magnets, the connector will open. Thus, the collar is limited to small animals, such as cats and miniature dogs.

U.S. Pat. No. 7,389,750 to Rogers, entitled Quick Connect Tether Connecting System, discloses a leash and collar system for a pet that uses magnetic coupling and locking elements. Additionally, U.S. Pat. No. 7,954,211 to De Bien, entitled Quick Connect Coupling Assembly describes a leash and collar system for a pet that uses magnetic coupling and locking elements. However, such assemblies are difficult to manipulate and actuate to couple and uncouple the components.

A need remains for a magnetic coupler that is cost effective and reliable. A need remains for a magnetic coupler that is easy to use.

BRIEF DESCRIPTION OF THE INVENTION

In one embodiment, a dog leash system is provided having an insert configured to be attached to a dog collar and a magnetic coupler configured to be attached to a leash. The magnetic coupler has a quick connect receiver receiving the insert. The magnetic coupler has a magnet magnetically attracting the insert into the quick connect receiver. The magnetic coupler has insert latches engaging and locking the insert in the quick connect receiver. The insert latches are releasable to allow the insert to be removed from the quick connect receiver. The magnetic coupler may be automatically locked when the insert is drawn into the magnetic coupler.

In another embodiment, a magnetic coupler is provided having a housing having a receptacle at a mating end of the housing where the receptacle is configured to receive an insert therein. Insert latches are movably coupled to the housing and located at the receptacle. The insert latches are movable between a locking position and a clearance position. The insert latches are configured to engage and lock the insert in the receptacle in the locking position. The insert latches allow the insert to be removed from the receptacle in the clearance position. A sheath is slidably coupled to and surrounds the housing. The sheath is movable between a cocked position and a blocking position. In the cocked position, the insert latches are capable of moving to the clearance position and in the released position the sheath is configured to block the insert latches from moving to the clearance position. A magnet is held by the housing. The magnet is configured to magnetically attract the insert into the receptacle. A sheath latch is movably coupled to the housing. The sheath is movable between a latched position and an unlatched position. In the latched position, the latch engages the sheath and holds the sheath in the cocked position. An ejector is movably coupled to the housing. The ejector is actuated to eject the insert from the receptacle. The coupler may transition from the clearance position to the locking position when the insert is inserted into the receptacle activating the trigger housed in the housing. The trigger releases the sheath from the cocked position to the blocking position.

DETAILED DESCRIPTION OF THE INVENTION

Figure 1:
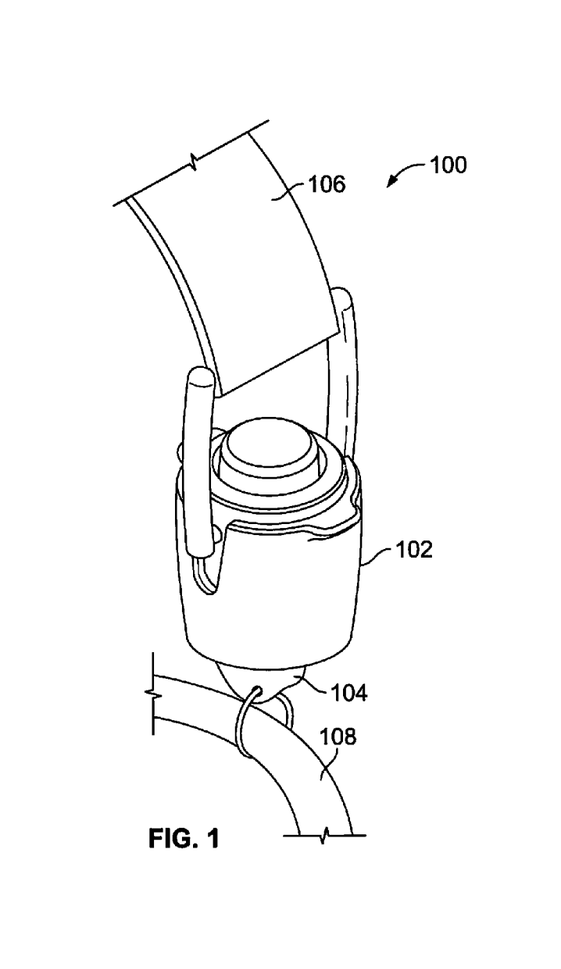
FIG. 1 illustrates a magnetic coupler system formed in accordance with an exemplary embodiment.

FIG. 1 illustrates a magnetic coupler system 100 formed in accordance with an exemplary embodiment. The magnet coupler system 100 includes a magnetic coupler 102 and an insert 104 configured to be coupled to the magnetic coupler 102. The magnetic coupler 102 is coupled to a first object 106 and the insert 104 is coupled to the second object 108. The magnetic coupler system 100 connects the first object 106 with the second object 108.

In an exemplary embodiment, the first object 106 may be a tether or leash. The second object 108 may be any type of object, including a pet collar. The magnetic coupler system 100 may be used as a dog leash system that is used to connect the leash to a collar. The magnetic coupler system 100 may be used in other applications in alternative embodiments such as industrial applications, marine applications, commercial applications, automotive applications, tooling applications, or in other fields to connect two objects together. The magnetic coupler system 100 may be connected to any type of object, including a strap, a hook, a wire, a rope or other types of objects.

The magnetic coupler system 100 utilizes magnets to magnetically attract the insert 104 to the magnetic coupler 102. The magnetic coupler 102 and/or the insert 104 may include one or more magnets therein. Optionally, the insert 104 may be quickly and easily coupled to and uncoupled from the magnetic coupler 102. Once coupled, the insert 104 may be locked or retained in the magnetic coupler 102 until the insert 104 is manually released from the magnetic coupler 102. Any type of know connecting means may be used to connect the first object 106 to the magnetic coupler 102 and to connect the second object 108 to the insert 104.

Figure 2:
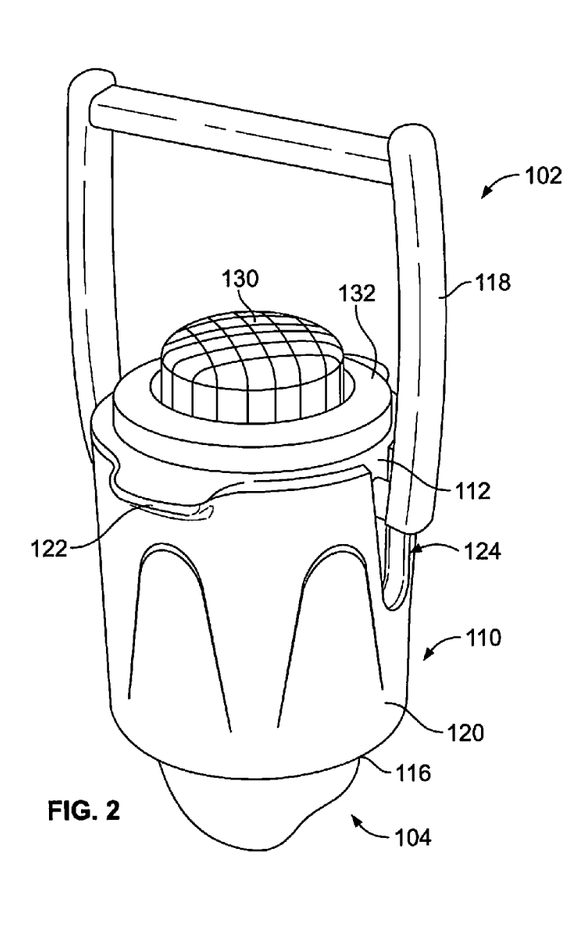
FIG. 2 is a side perspective view of a magnetic coupler for the magnetic coupler system and formed in accordance with an exemplary embodiment.
Figure 3:
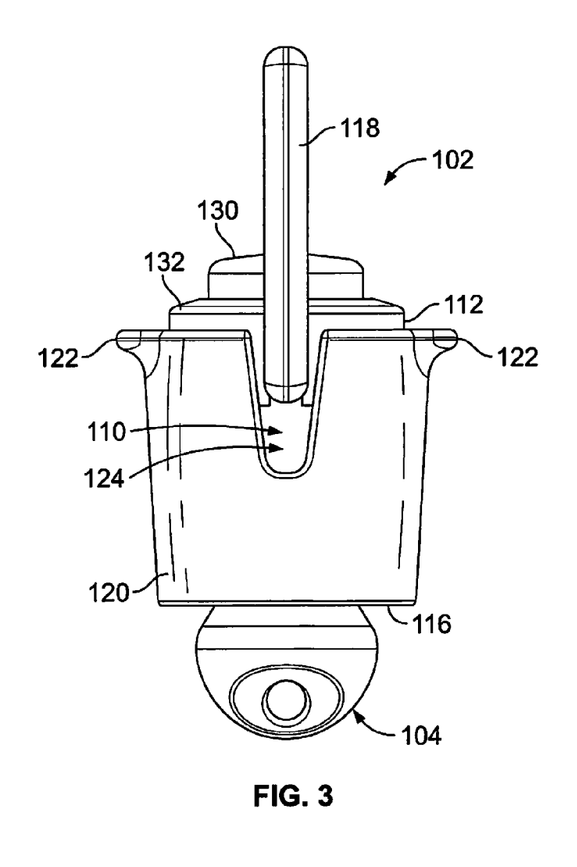
FIG. 3 is a side view of the magnetic coupler.
Figure 4:
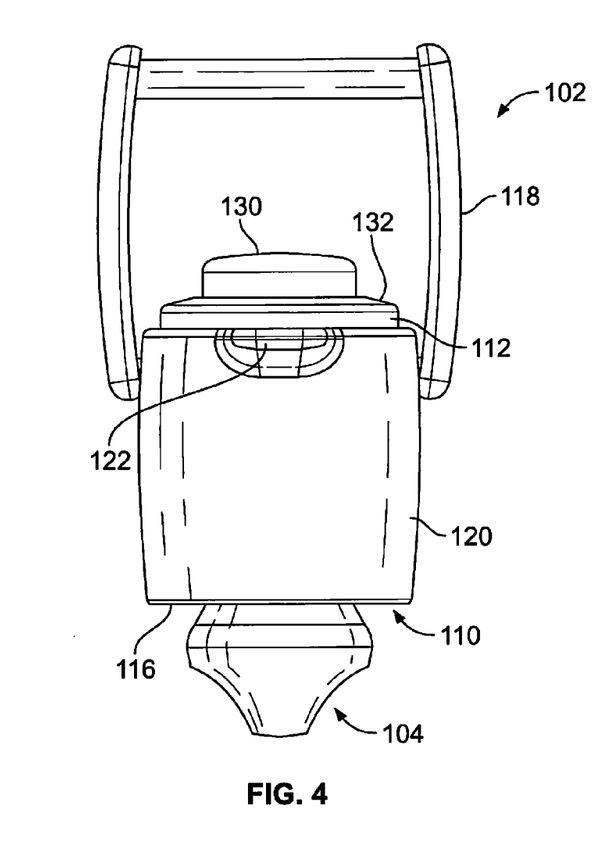
FIG. 4 is another side view of the magnetic coupler.

FIG. 2 is a side perspective view of the magnetic coupler 102 formed in accordance with an exemplary embodiment. FIG. 3 is a side view of the magnetic coupler 102. FIG. 4 is another side view of the magnetic coupler 102. The insert 104 is shown coupled to the magnetic coupler 102 in FIGS. 2-4. The magnetic coupler 102 includes a quick connect receiver 110 configured to receive the insert 104. The quick connect receiver 110 defines a female section of the magnetic coupler system 100 and the insert 104 defines a male section of the magnetic coupler system 100.

The quick connect receiver 110 includes a housing 112 having a receptacle 114 (shown in FIG. 6) at a mating end 116 of the housing 112. The receptacle 114 is configured to receive a plug end of the insert 104 therein. A handle 118 is coupled to the housing 112 for connecting the magnetic coupler 102 to the first object 106 (shown in FIG. 1). The handle 118 may be rotatably coupled to the housing 112. Other securing means may be provided in alternative embodiments to secure the magnetic coupler 102 to the first object 106.

The magnetic coupler 102 includes an outer sheath 120 slidably coupled to and surrounding the housing 112. The sheath 120 is movable between a cocked positioned and a blocking position. In the cocked position, quick connect features used to secure the insert 104 in the receptacle 114 are capable of being released to allow the insert 104 to be loaded into the receptacle 114 or removed from the receptacle 114. In the blocking position, the outer sheath 120 blocks the quick connect features from moving, thus securing the insert 104 in the receptacle 114.

In an exemplary embodiment, the sheath 120 includes finger grips 122 that allow a user to grasp the sheath 120 to move the sheath 120 from the blocking position to the cocked position. In an exemplary embodiment, the sheath 120 includes slots 124 proximate to the location where the handle 118 connects to the housing 112. The slots 124 allows the sheath 120 to move relative to the handle 118 and housing 112 between the cocked position and the blocking position.

The magnetic coupler 102 includes an ejector 130 that is movably coupled to the housing 112. The ejector 130 is actuated to eject the insert 104 from the receptacle 114. In an exemplary embodiment, as described in further detail below, the ejector 130 is used to lock the sheath 120 in the cocked position. When the ejector 130 is released, the sheath 120 may be freed to move from the cocked position to the blocking position, as described and further detailed below. In the illustrated embodiment, the ejector 130 is coupled to the housing 112 at a rear 132 or back end of the housing 112 generally opposite the mating end 116 or front of the magnetic coupler 102.

Figure 5:
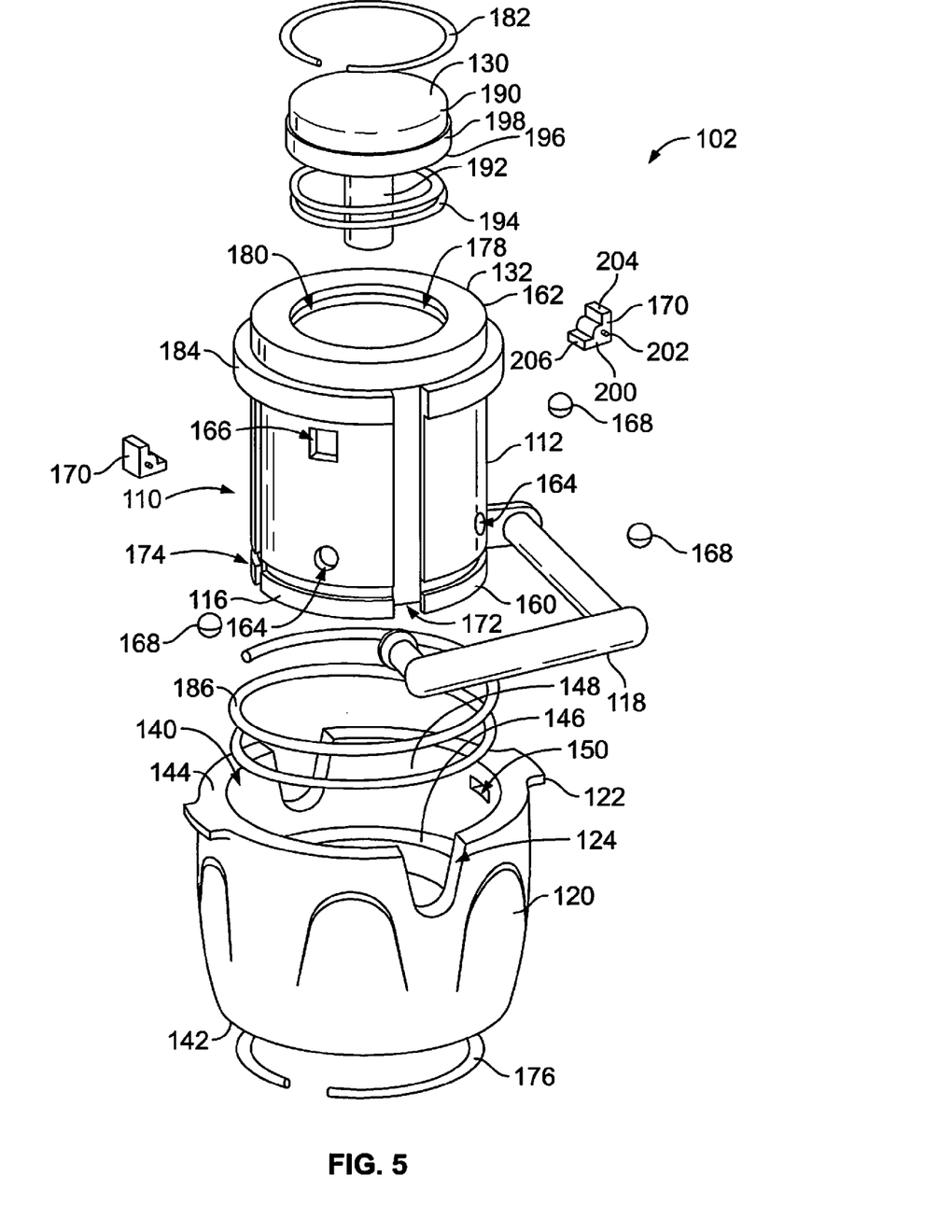
FIG. 5 is an exploded view of the magnetic coupler.

FIG. 5 is an exploded view of the magnetic coupler 102 showing the housing 112, sheath 120 and ejector 130. The sheath 120 includes a chamber 140 extending between a front 142 and a rear 144. The chamber 140 receives the housing 112. The sheath 120 is movable relative to the housing 112 during operation of the magnetic coupler 102. A shoulder 146 extends into the chamber 140 from an interior wall 148 defining the chamber 140. The shoulder 146 may limit travel of the sheath 120 relative to the housing 112. In an exemplary embodiment, the sheath 120 includes one or more pockets 150 in the interior wall 148 proximate to the rear 144.

The housing 112 extends between a front 160 and a rear 162. The receptacle 114 (shown in FIG. 6) is provided at the front 160 and is configured to receive the insert 104 (shown in FIG. 6). In an exemplary embodiment, the housing 112 includes front openings 164 proximate to the front 160 and rear openings 166 proximate to the rear 162. The front openings 164 are configured to receive insert latches 168 therein. The rear openings 166 are configured to receive sheath latches 170 that are used to lock the sheath 120 in a cocked position.

The insert latches 168 define quick connect features of the magnetic coupler 102 that are used to retain the insert 104 in the receptacle 114. The insert latches 168 are movable within the front openings 164 between a locking position and a clearance position. The insert latches 168 are configured to engage and lock the insert 104 in the receptacle 114 in the locking position. The insert latches 168 allow the insert 104 to be removed from the receptacle 114 in the clearance position. In an exemplary embodiment, the latches 168 are movable radially into and out of the receptacle 114 between the locking position and clearance position. In an exemplary embodiment, the insert latches 168 are ball bearings that are spherical in shape, where portions of the insert latches 168 are configured to be moved into the receptacle 114 in the locking position. Other types of insert latches may be used in alternative embodiments, such as spring loaded latches, rocker latches, or other type of latches.

The sheath latches 170 are movably coupled to the housing 112. For example, the sheath latches 170 may be rotatably coupled to the housing 112 in the rear openings 166. The sheath latches 170 are movable between a latched position and an unlatched position. In the latched position, the sheath latches 170 are configured to engage the sheath 120 and hold the sheath 120 in the cocked position. In the unlatched position, the sheath latches 170 are moved out of the way to provide clearance to allow the sheath 120 to move from the cocked position to the blocking position. In the blocking position, the sheath 120 is configured to block the insert latches 168 from moving out of the locking positions to the clearance positions. The sheath 120 is thus used to lock the insert 104 in the magnetic coupler 102 by blocking the insert latches 168 from moving to the clearance positions.

The housing 112 includes slots 172 along opposite sides thereof. The handle 118 is received in the slot 172. The handle 118 may be secured to the housing 112 by other means in alternative embodiments.

The housing 112 includes a grove 174 proximate to the front 160. The grove 174 is configured to receive a retaining ring 176 used to retain the sheath 120 on the housing 112.

In an exemplary embodiment, the housing 112 includes an ejector chamber 178 at the rear 162. The ejector chamber 178 receives the ejector 130. The ejector 130 is movable within the ejector chamber 178. In an exemplary embodiment, the housing 112 includes a groove 180 within the ejector chamber 178 that receives a retaining ring 182 used to retain the ejector 130 within the ejector chamber 178.

The housing 112 includes a flange 184 extending outward from an exterior surface of the housing 112. A biasing mechanism, such as a spring 186 is configured to be captured between the flange 184 and the shoulder 146 of the sheath 120. The spring 186 is configured to surround an exterior of the housing 112. The spring 186 is used to press the sheath 120 in a forward direction relative to the housing 112. The spring 186 is used to bias the sheath 120 to the blocking position after the sheath 120 is released from the cocked position. Other types of biasing mechanisms other than a spring may be used in alternative embodiments.

The ejector 130 includes a head 190 and a post 192 extending forward from the head 190. The post 192 is configured to extend through the housing 112 into receptacle 114. The post 192 is configured to engage the insert 104 to eject or release the insert 104 from the receptacle 114 when the ejector 130 is actuated. In an exemplary embodiment, a biasing mechanism, such as a spring 194 is configured to be positioned between the head 190 and a portion of the housing 112. The spring 194 may be biased against a front surface 196 of the head 190 to generally press the ejector 130 in a rearward direction. In use, the spring force of the spring 194 may be overcome as the ejector 130 is pressed and actuated to release the insert 104 from the housing 112. In an exemplary embodiment, the ejector 130 includes a flange 198 at the front of the head 190. The spring 194 may be biased against the flange 198. The sheath latches 170 may be biased against the flange 198.

Each sheath latch 170 includes a main body 200 having pins 202 extending from the main body 200. The sheath latch 170 includes a sheath arm 204 extending from one side of the main body 200 and an ejector arm 206 extending from the opposite side of the main body 200. The sheath arm 204 is configured to engage the sheath 120. For example, the sheath arm 204 may be received in the pocket 150 in the sheath 120. The ejector arm 206 is configured to engage the ejector 130. For example, the ejector arm 206 may engage the flange 198.

The sheath latches 170 are received in the rear openings 166 and may be pivoted about the pins 202. The sheath latches 170 are used to hold the sheath 120 in the cocked positioned. In an exemplary embodiment, the ejector 130 is used to hold the sheath latches 170 in the latched position to hold the sheath 120 in the cocked position. When the ejector 130 is released, the sheath latches 170 may be moved to unlatched positions allowing the sheath 120 to move from the cocked position to the blocking position. An exemplary operation of the magnetic coupler 102 is described in further detail below.

Figure 6:
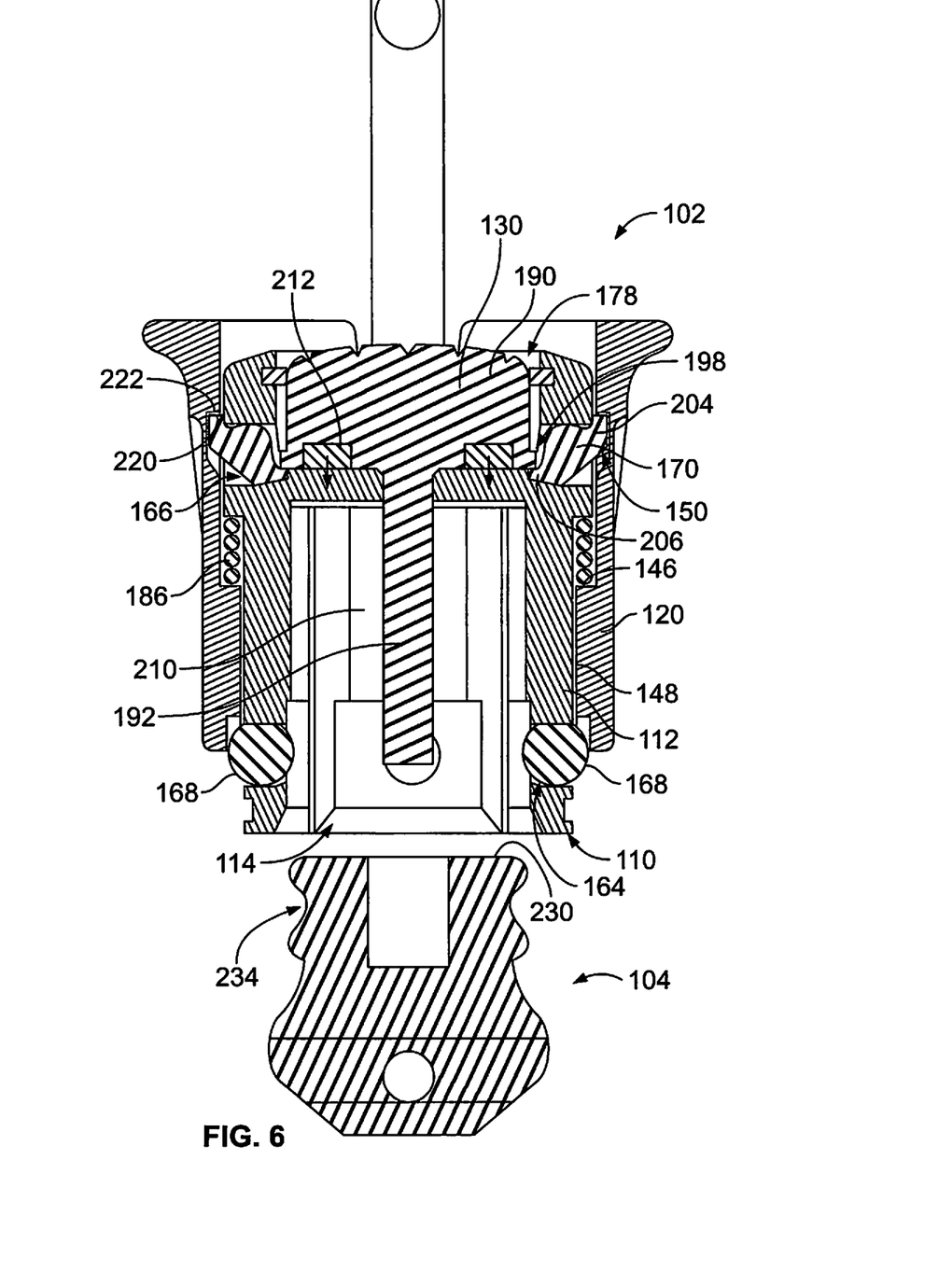
FIG. 6 is a cross-sectional view of the magnetic coupler and an insert showing the magnetic coupler cocked and ready to receive the insert.
Figure 7:
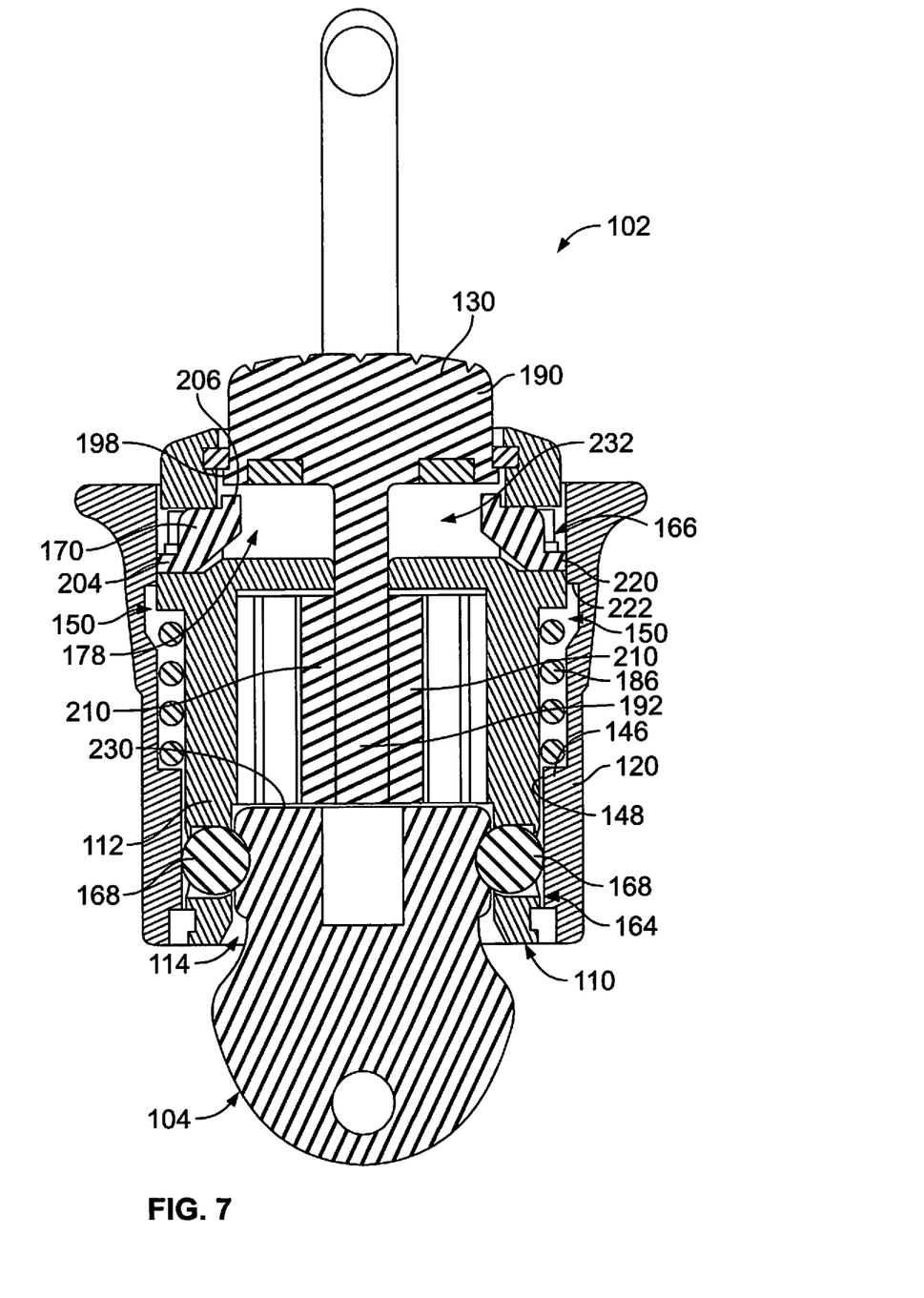
FIG. 7 is a cross-sectional view of the magnetic coupler and insert showing the insert locked into the magnetic coupler.

FIG. 6 is a cross sectional view of the magnetic coupler 102 and insert 104 showing the magnetic coupler 102 cocked and ready to receive the insert 104. FIG. 7 is a cross sectional view of the magnetic coupler 102 and insert 104 showing the insert 104 locked in the magnetic coupler 102.

In the cocked positioned (FIG. 6), the sheath 120 is pulled rearward relative to the housing 112 and the sheath latches 170 are in latched positions engaging the sheath 120 and holding the sheath 120 in the cocked positioned. The ejector 130 is actuated and pushed forward relative to the housing 112. The ejector 130 engages the sheath latches 170 and holds the sheath latches 170 in the latched positions.

In an exemplary embodiment, the magnetic coupler 102 includes a magnet 210 held in the housing 112. The magnet 210 is positioned proximate to the receptacle 114. The magnet 210 is used to magnetically attract the insert 104 into the receptacle 114. In an exemplary embodiment, the magnet 210 may be used to magnetically attract the ejector 130 and to hold the ejector 130 in a forward or actuated position. Optionally, the ejector 130 may hold a magnet 212 that is magnetically attracted to the magnet 210. For example, the magnets 210, 212 may have opposite polarity such that the magnet 210 is used to hold the ejector 130 in the forward position.

The ejector 130 engages the ejector arms 206 of the sheath latches 170. For example, the flange 198 may press against the ejector arms 206 causing the sheath latches 170 to rotate outward to the latched position. As the sheath latches 170 rotate outward, the sheath arms 204 extend outward from the rear openings 166 of the housing 112 into the pockets 150 of the sheath 120. Edges 220 of the ejector arms 206 engage corresponding shoulders 222 in the pockets 150. The sheath 120 is locked and restricted from moving from the cocked position by the sheath latches 170. Until the sheath latches 170 are rotated back into the rear openings 166, the sheath 120 is held in the cocked position.

The sheath latches 170 are able to rotate back into the rear openings 166 to the unlatched positions (shown in FIG. 7) when the ejector 130 is released to provide clearance for the ejector arms 206 to extend into the ejector chamber 178. In an exemplary embodiment, the ejector 130 is moved from the forward position (shown in FIG. 6) to the rearward position (shown in FIG. 7) by the insert 104. When the insert 104 is loaded into the receptacle 114, a plug end 230 of the insert 104 engages the post 192 and presses the post 192, and thus the ejector 130, in a rearward direction out of the receptacle 114 and rearward in the ejector chamber 178. The ejector 130 is automatically released when the insert 104 is drawn into the receptacle 114 by the magnet 210. When the ejector 130 is released, the sheath 120 is allowed to release to the blocking position (shown in FIG. 7). The spring 186 forces the sheath 120 forward to the blocking position. When the head 190 is moved rearward in the ejector camber 178, a clearance space 232 is defined in the ejector chamber 178 for the sheath latches 170. The sheath latches 170 are able to rotate inward such that the ejector arms 206 are positioned in the clearance space 232. As the sheath latches 170 rotate inward, the sheath arms 204 are transferred into the rear openings 166 and the housing 112. The sheath arms 204 are moved out of the pockets 150 and out of the way of the sheath 120 to allow the sheath 120 to move from the cocked position (shown in FIG. 6) to the blocking position (shown in FIG. 7).

In the blocking position, the shoulder 146 of the sheath 120 is aligned with the front openings 164 in the housing 112 and the insert latches 168 held in the front openings 164. The shoulder 146 of the sheath 120 blocks the insert latches 168 from moving radially outward from the front openings 164. The insert latches 168 are blocked from moving to the clearance position. The insert latches 168 are held in the locking positions, thus locking the insert 104 in the receptacle 114. In an exemplary embodiment, the insert 104 includes a circumferential groove 234 in a side of the plug end 230. The insert latches 168 are received in the grove 234 to lock the insert 104 in the quick connect receiver 110 defined by the housing 112. Optionally, the insert 104 may include a plurality of grooves rather than a single circumferential groove. The insert latches 168 may be received in corresponding grooves to lock the position of the insert 104 relative to the housing 112 and to limit rotation 104 relative to the housing 112. In the illustrated embodiment, the circumferential groove 234 allows the insert 104 to rotate within the receptacle 114.

In the locked position (shown in FIG. 7), the sheath 120 blocks the insert latches 168 from moving to the clearance position. Additionally, the sheath 120 blocks the sheath latches 170 from rotating from the unlatched positioned (shown in FIG. 7) to the latched position (shown in FIG. 6). The interior wall 148 of the sheath 120 stops the sheaths latches 170 from rotating outward. The ejector arms 206 thus block the ejector 130 from being actuated and pressed forward. The insert 104 is unable to be ejected from the receptacle 114 by the ejector 130 until the sheath 120 is released and moved to the cocked positioned.

Alternatively, the sheath latches 170 may be able to rotate outward even with the sheath 120 in the blocking position. Optionally, the pockets 150 may be aligned with the sheath arms 204 when the sheath 120 is in the blocking position such that, as the ejector 130 is pressed forward and actuated, the ejector 130 may press against the ejector arms 206 to cause the sheath latches 170 to rotate outward. As the sheath latches 170 rotate outward, the sheath arms 204 engage the sheath 120, such as the shoulder 222, and cause the sheath 120 to move rearward to the cocked positioned. Actuation of the ejector 130 may thus cause the sheath 120 to be cocked.

Figure 8:
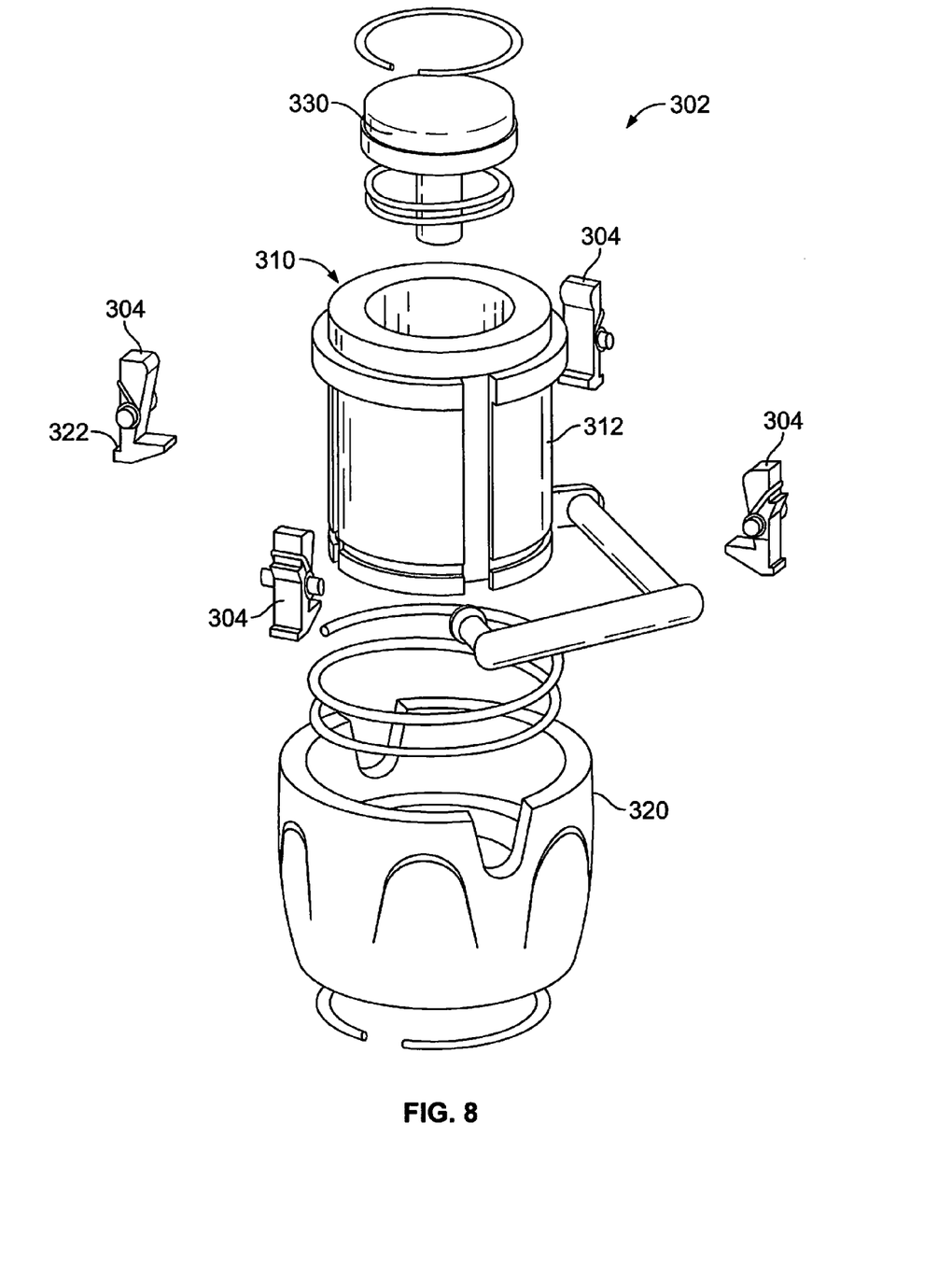
FIG. 8 is an exploded view of a magnetic coupler formed in accordance with an exemplary embodiment.

FIG. 8 is an exploded view of a magnetic coupler 302 formed in accordance with an exemplary embodiment. The magnetic coupler 302 is similar to the magnetic coupler shown in FIG. 5; however the magnetic coupler 302 includes different types of latches to cock the magnetic coupler and to hold an insert therein. For example, the magnetic coupler 302 includes latches 304 used to replace both the insert latches 168 and the sheath latches 170 (both shown in FIG. 5). The magnetic coupler 302 includes a quick connect receiver 310 configured to receive the insert 104 (shown in FIG. 1). The quick connect receiver 310 defines a female section of a magnetic coupler system.

The magnetic coupler 302 includes a housing 312 having a receptacle that receives a plug end of the insert 104 therein. The magnetic coupler 302 includes an outer sheath 320 slidably coupled to and surrounding the housing 312. The sheath 320 is movable between a cocked positioned and a blocking position. The latches 304 are used to secure the sheath 320 in the cocked position. For example, tabs 322 of the latches 304 may be positioned at a front of the sheath 320 to hold the sheath 320 in the cocked position. The latches 304 may be released, such as by an ejector 330, when the insert 104 is loaded into the receptacle. For example, the latches 304 may be rotated until the tabs 322 clear the front of the sheath 320. When the latches 322 are rotated, the latches 322 may latch onto the insert 104 and secure the insert 104 in the receptacle. In the blocking position, the outer sheath 320 blocks the latches 304 from moving outward or unlatching, thus securing the insert 104 in the receptacle.

The ejector 330 may be actuated to eject the insert 104 from the receptacle. As the ejector 330 is actuated, the latches 304 may be rotated outward against the sheath 320. The latches 304 may cause the sheath 320 to move rearward form the blocking position to the cocked position. Pressing of the ejector simultaneously causes the sheath 320 to move from the blocking position, the latches 304 to rotate outward, and the insert 104 to be ejected out of the receptacle.

The latches 304 define quick connect features of the magnetic coupler 302 that are used to retain the insert 104 in the receptacle. The latches 304 are movable, for example rotatable, relative to the housing 312 between a locking position and a clearance position. The latches 304 are configured to engage and lock the insert 104 in the receptacle in the locking position. The insert 104 is able to be removed from the receptacle when the latches 304 are in the clearance position. In an exemplary embodiment, the latches 304 may be spring biased toward the clearance position. A spring coupled to the latches 304 may press the latching ends of the latches 304 outward away from the receptacle. The latches 304 may be rocker latches rocking into and out of the receptacle. Other types of latches may be used in alternative embodiments.

The latches 304 include ramped or wedge-shaped posts that are thicker near the top and thinner near the bottom. As the ejector 330 rides vertically up and down inside the housing 312, the ejector 330 engages the wedge-shaped posts and causes the latching ends of the latches 304 to rock into and out of the receptacle. For example, when the ejector 330 is released or moved rearward (e.g. upward in the orientation shown in FIG. 8), the ejector 330 forces the latches 304 to press inward into the receptacle. The ejector 330 may be released by the insert 104 as the insert 104 is drawn into the receptacle by the magnet. When the ejector 330 is actuated or pressed forward (e.g. downward in the orientation shown in FIG. 8), more clearance is provided between the ejector 330 and the wedge-shaped posts due to the shape of the latches 304. The springs cause the latching ends of the latches 304 to pivot outward, thus unlatching the insert 104. The post of the ejector 330 presses the insert 104 out of the receptacle against the magnetic force.

Figure 9:
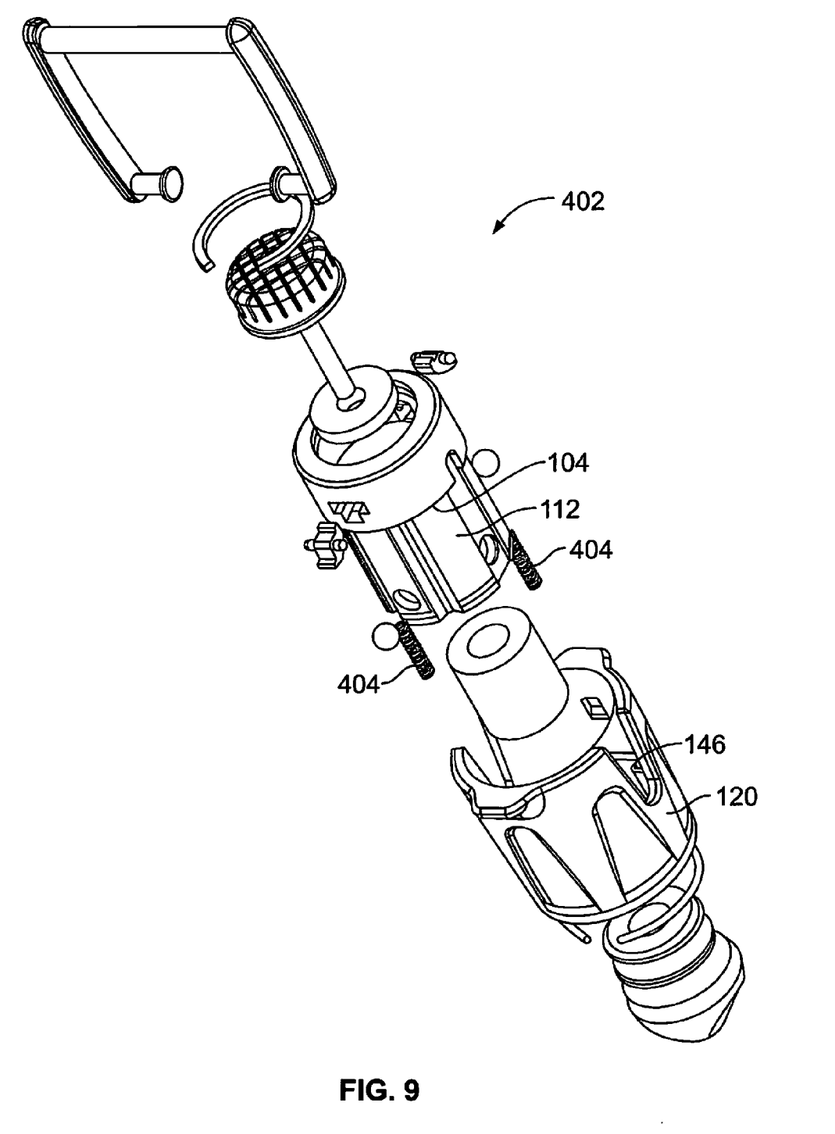
FIG. 9 is an exploded view of a magnetic coupler formed in accordance with an exemplary embodiment.
Figure 10:
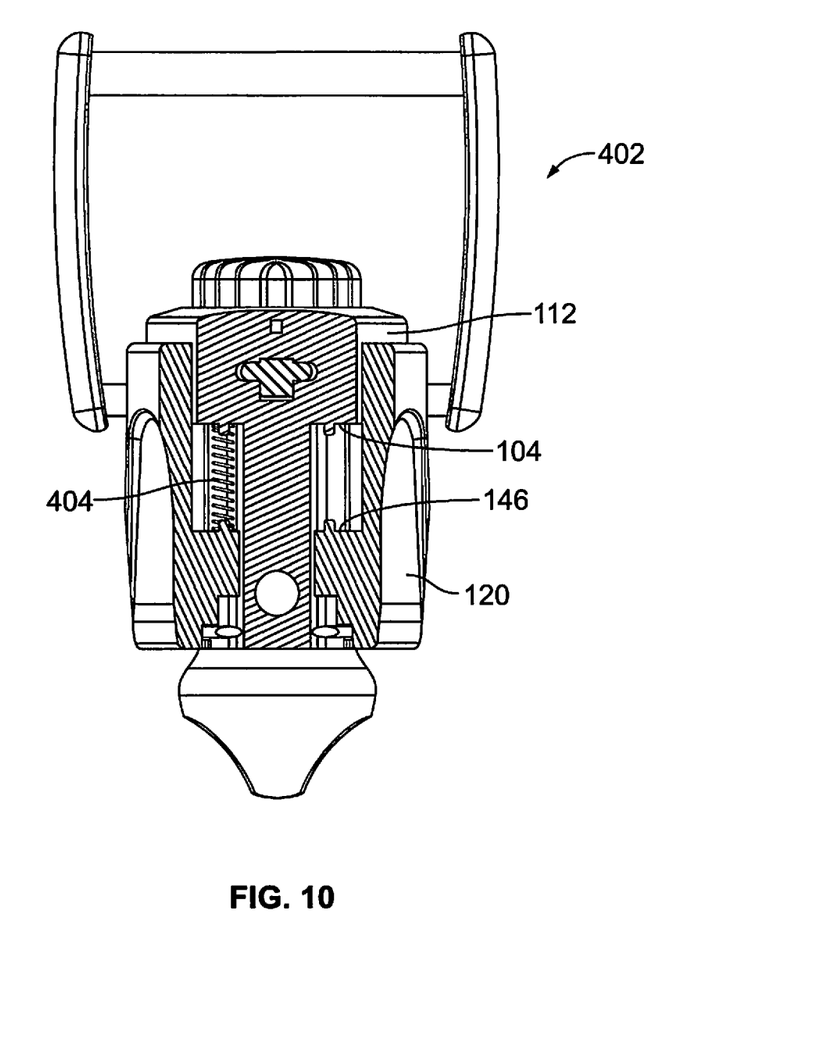
FIG. 10 is a cross-sectional view of the magnetic coupler shown in FIG. 9.

FIG. 9 is an exploded view of a magnetic coupler 402 formed in accordance with an exemplary embodiment. FIG. 10 is a cross-sectional view of the magnetic coupler 402. The magnetic coupler 402 is similar to the magnetic coupler 102 shown in FIG. 5; however the magnetic coupler 402 includes different types of springs 404 to support the insert therein. Like components of the magnetic coupler 402 are identified with like reference numerals of the magnetic coupler 102.

The springs 404 replace the spring 186 (shown in FIG. 5). The springs 404 are captured between the flange 184 of the housing 112 and the shoulder 146 of the sheath 120. The springs 404 are used to press the sheath 120 in a forward direction relative to the housing 112. The springs 404 are used to bias the sheath 120 to the blocking position after the sheath 120 is released from the cocked position.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. Dimensions, types of materials, orientations of the various components, and the number and positions of the various components described herein are intended to define parameters of certain embodiments, and are by no means limiting and are merely exemplary embodiments. Many other embodiments and modifications within the spirit and scope of the claims will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means—plus-function format and are not intended to be interpreted based on 35 U.S.C. §112, sixth paragraph, unless and until such claim limitations expressly use the phrase "means for" followed by a statement of function void of further structure.

What is claimed is:

1. A pet leash system comprising:
   an insert configured to be attached to one of a pet collar and a leash; and
   a magnetic coupler configured to be attached to the other of the pet collar and the leash, the magnetic coupler having a quick connect receiver receiving the insert, the magnetic coupler having an outer sheath slidably coupled to and surrounding the quick connect receiver, the magnetic coupler having a magnet magnetically attracting the insert into the quick connect receiver, the magnetic coupler having insert latches engaging and locking the insert in the quick connect receiver, the insert latches being releasable to allow the insert to be removed from the quick connect receiver, wherein the outer sheath blocking and allowing movement of the insert latches based on an axial position of the outer sheath with respect to the quick connect receiver.

2. The pet leash system of claim 1, wherein the insert latches are movably received in the quick connect receiver.

3. The pet leash system of claim 1, wherein the outer sheath is configured to be locked in a cocked position, the insert latches being movable when the outer sheath is in the cocked position.

4. The pet leash system of claim 1, further comprising a sheath latch coupled to the quick connect receiver, the sheath latch engaging the outer sheath to hold the outer sheath in a cocked positioned, the insert being allowed to enter and exit the quick connect receiver when the outer sheath is in the cocked positioned.

5. The pet leash system of claim 1, wherein the insert latches are ball bearings movable radially into and out of the quick connect receiver.

6. The pet leash system of claim 1, wherein the insert includes at least one groove in a side thereof, the insert latches being received in the at least one groove to lock the insert in the quick connect receiver.

7. The pet leash system of claim 1 wherein the magnetic coupler further comprises an ejector being actuated to overcome the magnetically attracting forces of the magnet to remove the insert from the quick connect receiver.

8. The pet leash systems of claim 7, wherein the ejector is configured to be coupled to the magnetic coupler by the magnet.

9. The pet leash systems of claim 1, wherein the magnetic coupler comprises a housing having a receptacle at a mating end of the housing receiving the insert therein, the insert latches being movably coupled to the housing and located at the receptacle, the insert latches being movable between a locking position and a clearance position, the insert latches engaging and locking the insert in the receptacle in the locking position, the insert latches allowing the insert to be removed from the receptacle in the clearance position, the outer sheath being slidably coupled to and surrounding the housing, the outer sheath being movable between a cocked position and a blocking position, wherein in the cocked position, the insert latches are capable of moving to the clearance position and in the released position the outer sheath is configured to block the insert latches from moving to the clearance position, the magnet being held by the housing, wherein the magnetic coupler comprises a sheath latch movably coupled to the housing, the sheath latch movable between a latched position and an unlatched position, wherein in the latched position the sheath latch engages the outer sheath and holds the outer sheath in the cocked position, and wherein the magnetic coupler comprises an ejector movably coupled to the housing, the ejector being actuated to eject the insert from the receptacle.

10. The pet leash systems of claim 9, wherein the insert latches comprised ball bearings movable radially into an out of the receptacle.

11. The pet leash systems of claim 9, wherein the outer sheath is slidable axially along an exterior of the housing, the outer sheath having at least one pocket configured to receive the insert latches in the cocked position to allow the insert latches to move to the cocked positioned.

12. The pet leash systems of claim 9, wherein the outer sheath blocks the sheath latch from moving to the latched position when the outer sheath is in the blocking position.

13. The pet leash systems of claim 9, wherein the ejector is blocked from being actuated when the sheath latch is in the unlatched positioned.

14. The pet leash systems of claim 9, wherein the outer sheath is slid in a rearward direction from the blocking position to the cocked position, the ejector being actuated by translating the ejector in a forward direction.

15. The pet leash systems of claim 14, wherein the ejector is blocked from moving in the forward direction by the sheath latch until the outer sheath is slid in the rearward direction.

16. The pet leash systems of claim 15, wherein the outer sheath includes a pocket receiving the sheath latch after the sheath latch is moved in the rearward direction.

17. The pet leash systems of claim 9, wherein the ejector includes a flange engaging the sheath latch and holding the sheath latch in the latching position.

18. The pet leash systems of claim 9, wherein the sheath latch includes a sheath arm engaging the outer sheath and ejector arm engaging the ejector, the sheath latch rocking between the latched position and the unlatched position, wherein the ejector presses the ejector arm in a forward direction as the ejector is actuated and wherein the latch arm is forced in a rearward direction as the ejector arm is pressed in the forward direction.

19. The pet leash systems of claim 9, wherein the ejector is magnetically coupled to the magnet to hold the sheath latch in the unlatch position until the ejector is released from the magnetically attractive forces of the magnetic, the outer sheath being held in the cocked position by the sheath latch until the sheath latch is allowed to move from the unlatched position.

20. The pet leash systems of claim 9, wherein the ejector includes a post extending into the receptacle, the post engaging the insert to release the insert from the receptacle.

* * * * *